United States Patent [19]
Pasek et al.

[11] Patent Number: 4,990,240
[45] Date of Patent: Feb. 5, 1991

[54] VANADIUM PASSIVATION IN A HYDROCARBON CATALYTIC CRACKING PROCESS

[75] Inventors: Eugene A. Pasek, Monroeville; Norman C. Morgan, Ford City, both of Pa.

[73] Assignee: Chevron Research Company, San Francisco, Calif.

[21] Appl. No.: 479,772

[22] Filed: Feb. 14, 1990

Related U.S. Application Data

[60] Division of Ser. No. 207,604, Jun. 16, 1988, Pat. No. 4,929,583, which is a continuation-in-part of Ser. No. 752,994, Jul. 8, 1985, abandoned.

[51] Int. Cl.$^5$ .............................................. C10G 11/04
[52] U.S. Cl. ...................................... 208/120; 208/46; 208/106; 502/64; 502/68; 502/521; 502/524; 502/516

[58] Field of Search .................... 502/68, 64, 516, 521; 208/120

[56] References Cited

U.S. PATENT DOCUMENTS

| | | | |
|---|---|---|---|
| 3,711,422 | 1/1973 | Johnson et al. | 252/414 |
| 3,977,963 | 8/1976 | Readal et al. | 208/120 |
| 4,101,417 | 7/1978 | Mitchell et al. | 208/120 |
| 4,377,494 | 3/1983 | Bertus et al. | 252/411 R |
| 4,465,589 | 8/1984 | Kukes et al. | 208/208 R |
| 4,520,120 | 5/1985 | Mitchell et al. | 502/68 |
| 4,791,085 | 12/1988 | Groenenboom | 502/64 |

Primary Examiner—Helane Myers

[57] ABSTRACT

Hydrocarbons containing vanadium are converted to lower boiling fractions employing a zeolitic cracking catalyst containing a significant concentration of a vanadium passivator.

4 Claims, No Drawings

VANADIUM PASSIVATION IN A HYDROCARBON CATALYTIC CRACKING PROCESS

This is a division of application Ser. No. 207,604, filed Jun. 16, 1988 now U.S. Pat. No. 4,929,583, which is a continuation-in-part of U.S. Ser. No. 752,994, filed Jul. 8, 1985 now abandoned.

FIELD OF INVENTION

This invention relates to an improved catalyst, the preparation, and a process for its use in the conversion of hydrocarbons to lower boiling fractions. More particularly, the invention is related to the use of a catalyst composition comprising a catalytically active crystalline aluminosilicate zeolite dispersed within a matrix containing a passivator to passivate vanadium deposited on catalysts during the conversion reaction.

BACKGROUND OF THE INVENTION

Crystalline aluminosilicate zeolites dispersed into a matrix of amorphous and/or amorphous/kaolin materials have been employed in the catalytic cracking of hydrocarbons for many years. The poisonous effects of metals contained in the feedstock when, for example, a gas oil is converted to a gasoline range boiling fraction, in lowering catalyst activity and selectivity for gasoline production and in reducing catalyst life have been described in the literature.

Initially, these adverse effects were avoided or controlled by charging feedstocks boiling below about 1050° F. and having total metal concentrations below 1 ppm. As the need for charging heavier feedstocks having higher concentrations of metals increased, additives such as antimony, tin and barium have been employed to mitigate the poisonous effects of metal contaminants such as nickel, vanadium and iron contained in the catalytic cracking process feedstocks. Reference is made to U.S. Pat. Nos. 3,711,422; 3,977,963; 4,101,417; and 4,377,494 as illustrative of such passivation procedures.

Recently, it had been disclosed that hydrocarbons containing vanadium can be converted to lower boiling fractions employing a zeolitic cracking catalyst containing a significant concentration of a calcium-containing additive as a vanadium passivating agent (U.S. Pat. No. 4,520,120) or by employing a catalytic cracking composition comprising a solid cracking catalyst and a diluent containing selected magnesium compounds as a vanadium passivating agent (U.S. Pat. No. 4,465,589).

SUMMARY OF THE INVENTION

In accordance with the invention there is provided a catalyst comprising (1) a crystalline aluminosilicate zeolite, (2) a clay or synthetic inorganic refractory oxide matrix, and (3) an effective concentration of a vanadium passivator.

Further, there is provided an improved process for the conversion of a vanadium-containing hydrocarbonaceous oil to lower boiling hydrocarbon products employing the above-described catalyst.

DESCRIPTION OF THE PREFERRED EMBODIMENT

The catalyst composition of the present invention will comprise a crystalline aluminosilicate zeolite, a matrix material, and an effective concentration of a vanadium passivator.

The crystalline aluminosilicate zeolite component of the present invention can be generally characterized as being a crystalline, three-dimensional, stable structure containing a large number of uniform openings or cavities interconnected by relatively uniform channels. The formula for the zeolites can be represented as follows:

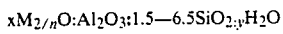

where M is a metal cation and n its valence; x varies from 0 to 1; and y is a function of the degree of dehydration and varies from 0 to 9. M is preferably a rare earth metal cation such as lanthanum, cerium, praseodymium, neodymium or mixtures thereof.

Zeolites which can be employed in the practice of this invention include both natural and synthetic zeolites. These natural occurring zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like Suitable synthetic zeolites which can be employed in the inventive process include zeolites X, Y, A, L, ZK-4, B, E, F, H, J, M, Q, T, W, Z, alpha and beta, ZSM-types and omega. The effective pore size of synthetic zeolites are suitably between 6 and 15 A in diameter. The term "zeolites" as used herein contemplates not only aluminosilicates but substances in which the aluminum is replaced by gallium and substances in which the silicon is replaced by germanium or phosphorus and other zeolites such as ultrastable Y. The preferred zeolites are the synthetic faujasites of the types Y and X or mixtures thereof.

It is also well known in the art that to obtain good cracking activity the zeolites must be in good cracking form. In most cases this involves reducing the alkali metal content of the zeolite to as low a level as possible, as a high alkali metal content reduces the thermal structural stability, and the effective lifetime of the catalyst is impaired. Procedures for removing alkali metals and putting the zeolite in the proper form are known in the art.

The crystalline alkali metal aluminosilicate can be cation-exchanged by treatment with a solution essentially characterized by a pH in excess of about 4.5, preferably by a pH in excess of 5, and containing an ion capable of replacing the alkali metal and activating the catalyst. The alkali metal content of the finished catalyst should be less than about 1 and preferably less than about 0.5 percent by weight The cation-exchange solution can be contacted with the crystalline alumino-silicate of uniform pore structure in the form of a fine powder, a compressed pellet, extruded pellet, spheroidal bead or other suitable particle shapes Desirably, the zeolite comprises from about 3 to about 35, preferably from about 5 to about 25 weight percent of the total catalyst.

The zeolite is incorporated into a matrix. Suitable matrix materials include the naturally occurring clays, such as kaolin, halloysite and montmorillonite and inorganic oxide gels comprising amorphous catalytic inorganic oxides such as silica, silica-alumina, silica-zirconia, silica-magnesia, alumina-boria, alumina-titania, and the like, and mixtures thereof. Preferably the inorganic oxide gel is a silica-containing gel, more preferably the inorganic oxide gel is an amorphous silica-alumina component, such as a conventional silica-alumina cracking catalyst, several types and compositions of which are commercially available. These materials are generally prepared as a co-gel of silica and alumina or as alumina precipitated on a pre-formed and pre-aged hydrogel. In general, silica is present as the major component in the catalytic solids present in such gels, being present in amounts ranging between about 55 and 100 weight percent, preferably the silica will be present in amounts ranging from about 70 to about 90 weight percent. The matrix component may suitably be present in the catalyst of the present invention in an amount ranging from about 55 to about 92 weight percent, preferably from about 60 to about 80 weight percent, based on the total catalyst.

A catalytically inert porous material may also be present in the finished catalyst. The term "catalytically inert" refers to a porous material having substantially no catalytic activity or less catalytic activity than the inorganic gel component or the clay component of the catalyst. The inert porous component can be an absorptive bulk material which has been pre-formed and placed in a physical form such that its surface area and pore structure are stabilized. When added to an impure inorganic gel containing considerable amounts of residual soluble salts, the salts will not alter the surface pore characteristics measurably, nor will they promote chemical attack on the pre-formed porous inert material. Suitable inert porous materials for use in the catalyst of the present invention include alumina, titania, silica, zirconia, magnesia, and mixtures thereof. The porous inert material, when used as a component of the catalyst of the present invention, is present in the finished catalyst in an amount ranging from about 10 to 30 weight percent based on the total catalyst.

The vanadium passivator employed in the catalyst of this invention shall have a passivation factor of at least 2.0 as defined by the following relationship:

$$\text{Passivation Factor} = \frac{(r_{cation})(r_{anion})(Z_{cation})}{(Z_{anion})}$$

where:
$r_{cation}$ = the radius of cation, Å
$r_{anion}$ = the radius of anion, Å
$Z_{cation}$ = the charge on the cation
$Z_{anion}$ = the charge on the anion The counterion or anion of the passivator must be an anion of the weak non-volatile acid which has a pKa >5. Thus counterions as chlorides, nitrates, sulfates, organic acids, etc. are to be avoided in the selection of the vanadium passivator. Additionally, if the cation of the vanadium passivator is an alkaline earth or alkaline metal, the anion cannot be an oxide or hydroxide. Although not to be limited thereto, preferred vanadium passivators are comprised of a metal cation and an oxymetal anion. The most preferred metal cations are those Group IIA metals having an atomic number greater than 20. These metals include strontuim, barium, and radium. Preferably, oxyanions should have a radius of at least 1.85 Å. Examples of suitable vanadium passivators are listed below in Table I:

TABLE I

| VANADIUM PASSIVATOR PERFORMANCE AT 1% VANADIUM LOADING | |
|---|---|
| Compound | Passivation Factor |
| SrCo$_3$ | 2.07 |
| SrTiO$_3$ | 2.24 |
| SrZrO$_3$ | 2.35 |

TABLE I-continued

| VANADIUM PASSIVATOR PERFORMANCE AT 1% VANADIUM LOADING | |
|---|---|
| Compound | Passivation Factor |
| BaCO$_3$ | 2.48 |
| BaTiO$_3$ | 2.68 |
| BaZrO$_3$ | 2.81 |
| La$_2$(CO$_3$)$_3$ | 2.81 |
| Ce$_2$(CO$_3$)$_3$ | 2.87 |
| CeTIO$_4$ | 2.39 |
| CeZrO$_4$ | 2.50 |

It has been determined that the size of the anion and cation of the vanadium passivator are directly related to the effectiveness of the passivator. A comparison of the effectiveness of various passivators when employed in hydrocarbon cracking processes demonstrates that the effectiveness of the vanadium passivator is directly proportional to the size of the cation. Similarly, such data also demonstrates that the larger the anion the greater is the effectiveness of the vanadium passivator. Thus, vanadium passivation is dependent on both ionic sizes.

The charge of these ions also has an impact on the effectiveness of the passivation. Data obtained in the hydrocarbon cracking processes employing vanadium passivators of this invention demonstrate that passivation is directly proportional to the valence state of the cation and inversely proportional to the charge on the anion. Thus, the passivation factor, indicative of the effectiveness of the vanadium passivation as set forth above, can be described by the following empirical relationship:

$$\text{Passivation Factor} = \frac{(r_{cation})(r_{anion})(Z_{cation})}{(Z_{anion})}$$

The cation or anion of the passivator must be an anion of a weak non-volatile acid having a pKa>5. Otherwise, the liberated acid or the resulting base could destroy the zeolites and accordingly, counterions as chlorides, nitrates, sulfates, sulfides, and organic acids are to be avoided as indicated above.

The concentration of the vanadium passivator, based on the total catalyst composition, shall be in the range of 5 to 40 weight percent, preferably in the range of 10 to 25 weight percent.

The catalyst of the present invention can be prepared by any one of several conventional methods. One method comprises making an inorganic oxide hydrogel and separate aqueous slurries of the zeolite component, the vanadium passivator and if desired, the porous catalytically inert component. The slurries can then be blended into the hydrogel, and the mixture homogenized. The resulting homogeneous mixture can be spray dried and washed free of extraneous soluble salts using, for example, a dilute ammonium sulfate solution in water. After filtering, the resulting catalyst can be calcined to reduce the volatile content to less than 12 weight percent.

The charge stocks employed in the process of this invention can contain significantly higher concentrations of vanadium than those employed in the conventional catalytic cracking processes, as the catalyst of this invention is effective in cracking processes operated at vanadium containment levels in excess of 4,000 ppm, even exceeding 30,000 ppm. Thus, the charge stocks to the catalytic cracking process of this invention can contain vanadium contaminants up to 3.5 ppm and higher with no significant reduction in effective catalyst life when compared with conventional catalytic cracking processes wherein the concentration of vanadium contaminants in the charge stock is controlled at a level of less than 1.5 ppm.

Although not to be limited thereto, a preferred method of employing the catalyst of this invention is by fluid catalytic cracking using riser outlet temperatures between about 900° to about 1100° F. (482° to 593° C.). Under fluid catalytic cracking conditions, the cracking occurs in the presence of a fluidized composited catalyst in an elongated reactor tube commonly referred to as a riser.

In operation, a contact time (based on feed) of up to 15 seconds and catalyst-to-oil weight ratios of about 4:1 to about 15:1 are employed. Steam can be introduced into the oil inlet line to the riser and/or introduced independently to the bottom of the riser so as to assist in carrying regenerated catalyst upward through the riser.

The riser system at a pressure in the range of about 5 to about 50 psig (135 kPa to 446 kPa) is normally operated with catalyst and hydrocarbon feed flowing concurrently into and upward into the riser at about the same velocity, thereby avoiding any significant slippage of catalyst relative to hydrocarbon in the riser and avoiding formation of the catalyst bed in the reaction flowstream.

The catalyst containing metal contaminants and carbon is separated from the hydrocarbon product effluent withdrawn from the reactor and passed to regenerator. In the regenerator, the catalyst is heated to a temperature in the range of about 800° to about 1800° F. (427° to 982° C.), preferably 1150° to 1400° F. (621° to 760° C.) for a period of time ranging from three to thirty minutes in the presence of an oxygen-containing gas. This burning step is conducted so as to reduce the concentration of the carbon on the catalyst to less than 0.3 weight percent by conversion of the carbon to carbon oxide and carbon dioxide.

The following examples are presented to illustrate objectives and advantages of the invention. However, it is not intended that the invention should be limited to the specific embodiments presented therein.

EXAMPLE 1

A catalyst composition was prepared by combining 65 weight percent halloysite, 20 weight percent of a rare earth exchanged Y zeolite (REY) and 15 weight percent of barium titanate as a vanadium passivator, and wet mixing in water for a period of time to provide a homogeneous mixture. The mixture was filtered and the cake dried for twenty-four hours at 120° C. and the dried catalyst sized thru 100 mesh and heat shocked by heating the catalyst in the furnace for 1 hour at 1100° F. (593° C.)

In the preparation of catalysts containing vanadium as a contaminant in this and subsequent Examples, vanadium naphthanate was dissolved in benzene and the above-prepared catalyst impregnated with a solution by incipient wetness and dried for twenty hours at 120° C. The catalyst was then calcined for ten hours at 538° C. Thereafter, the catalyst was again impregnated with the benzene solution of vanadium napthanate as previously described and the drying and calcining steps repeated to obtain a catalyst composition having the desired concentration of vanadium as a contaminant. The catalyst was then sized to 100-200 mesh.

The catalyst of this and subsequent examples were evaluated in a microactivity test unit. Prior to testing, the catalysts were steamed at 1350° F. (732° C.) for 14 hours at atmospheric pressure to simulate equilibrium surface area and activity.

Catalytic cracking conditions employed were 9670° F. (516° C.), a space velocity of 16.0 WHSV and a catalyst/oil ratio of 3.0. The gas oil feed to the reactor in this and subsequent examples can be characterized as follows:

| | |
|---|---|
| Gravity, °API | 27.9 |
| Sulfur, wt % | 0.59 |
| Nitrogen, wt % | 0.09 |
| Carbon Residue, wt % | 0.33 |
| Aniline Point, °F. | 190.2 |
| Nickel, ppm | 0.3 |
| Vanadium, ppm | 0.3 |
| Vacuum Distillation, °F. | |
| 10% at 760 mm Hg | 595 |
| 30% at 760 mm Hg | 685 |
| 50% at 760 mm Hg | 765 |
| 70% at 760 mm Hg | 846 |
| 90% at 760 mm Hg | 939 |

The results obtained by employing a catalyst prepared in accordance with the above-described procedure containing a vanadium contamination of 10,000 ppm (Run 2) and 20,000 ppm (Run 3) are shown below in Table II in comparison with the results obtained with the catalyst prepared as described above with the exception that there is no vanadium contamination (Run 1):

TABLE II

| | 20REY/15BaTiO3/HA | | |
|---|---|---|---|
| Run Nos. | 1 | 2 | 3 |
| Vanadium, ppm | 0 | 10,000 | 20,000 |
| Conversion, vol % | 85.78 | 75.75 | 71.83 |
| Products Yields, Vol % | | | |
| Total C3's | 15.49 | 7.94 | 7.44 |
| Propane | 8.04 | 2.35 | 2.15 |
| Propylene | 7.45 | 5.59 | 5.30 |
| Total C4's | 19.84 | 13.43 | 12.56 |
| I-Butane | 11.43 | 6.67 | 6.07 |
| N-Butane | 3.77 | 1.74 | 1.58 |
| Total Butenes | 4.64 | 5.02 | 4.91 |
| C5-430F. Gasoline | 63.38 | 60.25 | 57.68 |
| 430-650F. LCGO | 11.27 | 17.78 | 19.05 |
| 650F. + DO | 2.95 | 6.48 | 9.12 |
| C3 + Liq. Rec. | 112.93 | 105.88 | 105.85 |
| FCC Gaso. + Alk. | 84.60 | 78.96 | 75.66 |
| Product Yields, Wt % | | | |
| C2 and Lighter | 3.56 | 2.39 | 2.38 |
| H2 | 0.14 | 0.39 | 0.43 |
| Methane | 1.07 | 0.64 | 0.62 |
| Ethane | 1.09 | 0.66 | 0.64 |
| Ethylene | 1.25 | 0.70 | 0.69 |
| Carbon | 6.84 | 5.75 | 5.23 |
| Wt. Balance | 101.14 | 97.98 | 98.44 |

EXAMPLE 2

The necessity of employing a vanadium passivator wherein the counterion or anion of the passivator is an anion of a weak, non-volatile acid which has a pKa greater than 5 was demonstrated by preparing a catalyst composition in accordance with the previously-described procedure with the exception that calcium sulfite was substituted for the barium titanate of Example 1. Calcium sulfite has a passivation factor of 2.08 and the results obtained by employing the described catalyst containing vanadium contamination of 10,000 ppm (Run 5) and 20,000 ppm (Run 6) are shown below in Table III in comparison with the results obtained under the same conditions employing the catalyst free of vanadium:

TABLE III

| | 20REY/15CaSO3/HA | | |
|---|---|---|---|
| Run Nos. | 4 | 5 | 6 |
| Vanadium, ppm | 0 | 10,000 | 20,000 |
| Conversion, vol % | 84.15 | 66.12 | 34.26 |
| Products Yields, vol % | | | |
| Total C3's | 16.90 | 6.16 | 2.47 |
| Propane | 9.72 | 1.40 | 0.53 |
| Propylene | 7.18 | 4.76 | 1.94 |
| Total C4's | 20.81 | 10.72 | 3.13 |
| I-Butane | 12.14 | 4.44 | 0.94 |
| N-Butane | 4.01 | 1.11 | 0.31 |
| Total Butenes | 4.67 | 5.18 | 1.87 |
| C5-430F. Gasoline | 57.95 | 53.05 | 26.29 |
| 430-650F. LCGO | 11.93 | 22.13 | 29.54 |
| 650F. + DO | 3.92 | 11.75 | 36.20 |
| C3 + Liq. Rec. | 111.52 | 103.80 | 97.62 |
| FCC Gaso. + Alk. | 78.76 | 70.59 | 33.01 |
| Product Yields, Wt % | | | |
| C2 and Lighter | 3.22 | 3.34 | 2.91 |
| H2 | 0.13 | 0.52 | 0.61 |
| Methane | 0.94 | 0.64 | 0.43 |
| Ethane | 0.99 | 1.03 | 0.81 |
| Ethylene | 1.16 | 1.15 | 1.06 |
| Carbon | 8.28 | 4.89 | 4.67 |
| Wt. Balance | 100.52 | 99.08 | 99.51 |

A comparison of the results obtained in Examples 1 and 2 demonstrate that at a vanadium contamination level of 20,000 ppm a high conversion is maintained employing the catalyst of the invention whereas a conversion of only 34.26 volume percent is obtained at the vanadium contamination level of 20,000 ppm employing calcium sulfite.

TABLE IV

VANADIUM PASSIVATOR PERFORMANCE AT 1% VANADIUM LOADING

| Compound | Passivation Factor | Normalized Vol. % Conversion/ Gram-Atom | Normalized Vol. % C5 + Gasoline/ Gram-Atom |
|---|---|---|---|
| SrCO3 | 2.07 | 735 | 810 |
| SrTiO3 | 2.24 | 850 | 902 |
| SrZrO3 | 2.35 | 1144 | 1228 |
| BaCO3 | 2.48 | 957 | 1093 |

TABLE IV-continued

VANADIUM PASSIVATOR PERFORMANCE AT 1% VANADIUM LOADING

| Compound | Passivation Factor | Normalized Vol. % Conversion/ Gram-Atom | Normalized Vol. % C5 + Gasoline/ Gram-Atom |
|---|---|---|---|
| BaTiO3 | 2.68 | 1099 | 1145 |
| BaZrO3 | 2.81 | 1444 | 1450 |
| La2(CO3)3 | 2.81 | 1544 | 1499 |
| Ce2(CO3)3 | 2.87 | 1598 | 1560 |
| CeTiO4 | 2.39 | 984 | 980 |
| CeZro4 | 2.50 | 1085 | 1127 |

TABLE V

VANADIUM PASSIVATOR PERFORMANCE AT 2% VANADIUM LOADING

| Compound | Passivation Factor | Normalized Vol. % Conversion/ Gram-Atom | Normalized Vol. % C5 + Gasoline/ Gram-Atom |
|---|---|---|---|
| SrCO3 | 2.07 | 755 | 813 |
| SrTiO3 | 2.24 | 750 | 775 |
| SrZrO3 | 2.35 | 1015 | 1053 |
| BaCO3 | 2.48 | 925 | 1046 |
| BaTiO3 | 2.68 | 1042 | 1097 |
| BaZrO3 | 2.81 | 1357 | 1465 |
| La2(CO3)3 | 2.81 | 12-8 | 1245 |
| Ce2(CO3)3 | 2.87 | 1174 | 1154 |
| CeTiO4 | 2.39 | 877 | 813 |
| CeZro4 | 2.50 | 586 | 536 |

Obviously, modifications and variations of the invention, as hereinabove set forth, can be made without departing from the spirit and scope thereof, and therefore only such limitations should be imposed as are indicated in the appended claims.

We claim:

1. A process for the catalytic cracking of a vanadium-containing hydrocarbon charge stock which comprises contacting said charge stock under catalytic cracking conditions with the catalyst composition comprising a crystalline aluminosilicate zeolite, a matrix material, and from 5 to 40 weight percent, based on the total catalyst composition, of a vanadium passivator having a passivation factor of at least 2.0, the anion of said vanadium passivator is of a weak non-volatile acid having a pKa greater than 5 and the cation is a Group IIA metal having an atomic number of greater than 20.

2. The process of claim 1 wherein said anion in an oxyanion having a radius of at least 1.85 Å.

3. The process of claim 1 wherein said vanadium passivator is comprised of a metal cation and an oxy-metal anion.

4. The process of claim 1 wherein the concentration of said vanadium passivator is in the range of 10 to 25 weight percent, based on the total catalyst composition.

* * * * *